(12) United States Patent
Fraueneder

(10) Patent No.: US 10,014,694 B2
(45) Date of Patent: *Jul. 3, 2018

(54) POWER SUPPLY APPARATUS

(71) Applicant: ENGEL AUSTRIA GmbH, Schwertberg (AT)

(72) Inventor: Harald Fraueneder, Garsten (AT)

(73) Assignee: Engel Austria GMBH, Schwertberg (AT)

( * ) Notice: Subject to any disclaimer, the term of this patent is extended or adjusted under 35 U.S.C. 154(b) by 350 days.

This patent is subject to a terminal disclaimer.

(21) Appl. No.: 14/791,823

(22) Filed: Jul. 6, 2015

(65) Prior Publication Data

US 2016/0072295 A1 Mar. 10, 2016

(30) Foreign Application Priority Data

Jul. 7, 2014 (AT) ..................................... 539/2014

(51) Int. Cl.
*H02J 5/00* (2016.01)
(52) U.S. Cl.
CPC ..................................... *H02J 5/00* (2013.01)
(58) Field of Classification Search
CPC ........................................................ H02J 5/00
USPC ........................................................... 307/31
See application file for complete search history.

(56) References Cited

U.S. PATENT DOCUMENTS

| 2004/0095115 A1* | 5/2004 | Kernahan | ........... H02M 1/0845 323/282 |
| 2008/0259666 A1 | 10/2008 | Eguchi et al. | |
| 2011/0273148 A1 | 11/2011 | Ueno et al. | |
| 2014/0008977 A1 | 1/2014 | Koukkari et al. | |

FOREIGN PATENT DOCUMENTS

| CN | 103001238 | 3/2013 |
| DE | 41 31 823 | 2/1993 |
| DE | 101 59 645 | 6/2003 |

(Continued)

OTHER PUBLICATIONS

Search Report dated Jul. 18, 2017 in Chinese Patent Application No. 201510650004.93.

(Continued)

*Primary Examiner* — Joseph Chang
(74) *Attorney, Agent, or Firm* — Wenderoth, Lind & Ponack, L.L.P.

(57) ABSTRACT

A power supply apparatus for a shaping machine includes an intermediate circuit to be connected to at least one drive of the shaping machine, a power supply mains, and a power storage device. A measuring device measures an electric voltage or an electric current at the intermediate circuit, and a closed-loop regulating device regulates a power transfer between the power supply mains and the intermediate circuit based on the measured voltage or the measured current. The closed-loop regulating device can increase a main power furnished by the power supply main to the intermediate circuit if the measured voltage or the measured current leaves a first range, and can reduce the main power if the measured voltage or the measured current passes into a second range, the second range being smaller than the first range and completely contained in the first range.

22 Claims, 5 Drawing Sheets

(56) References Cited

FOREIGN PATENT DOCUMENTS

| DE | 10 2007 024 567 | 11/2008 |
|----|-----------------|---------|
| DE | 10 2010 025 647 | 12/2011 |
| DE | 102010023536    | 12/2011 |

OTHER PUBLICATIONS

Austrian Patent Office Search Report (ASR) dated May 22, 2015 in Austrian Patent Application No. A 539/2014.

* cited by examiner

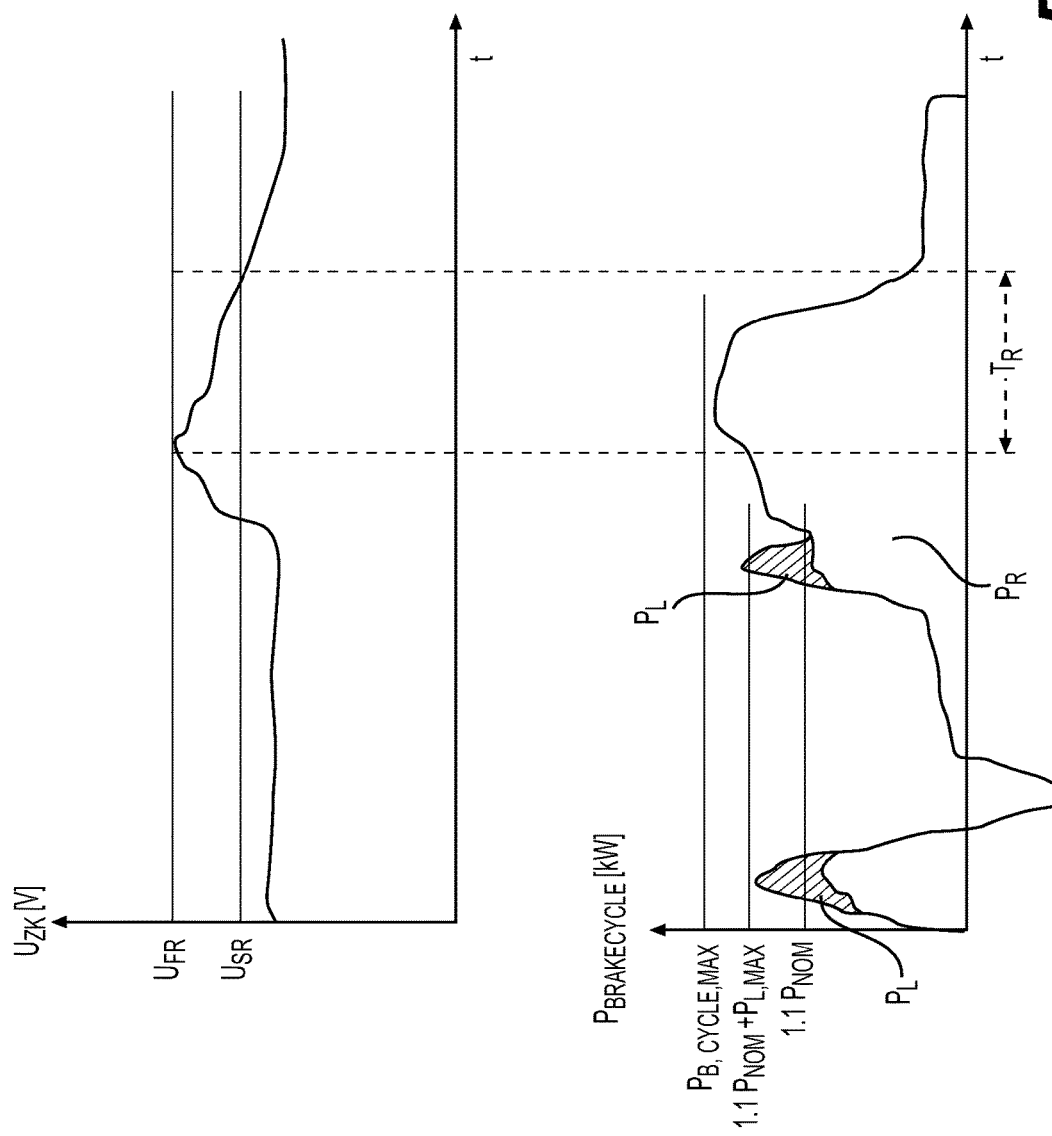

ns herein. The intermediate circuit can include at least part of the power storage device.

POWER SUPPLY APPARATUS

BACKGROUND OF THE INVENTION

The present invention concerns a power supply apparatus for a shaping machine and a method of power supply for a shaping machine.

The term shaping machines can be used to denote injection moulding machines, injection presses, presses and the like.

It is known for the power to be provided for electrical axis motions by a supplier (=power provision) via a DC bus. That is effected by rectification of the mains input voltage and an additional increase thereof by 35% relative to the rectified value. That DC voltage is changed into a rotating field again in the power inverter in order to drive the motor therewith. The rotary speed and the power of the motor can be regulated by the configuration of that rotating field. In the case of regenerative-capable systems, it is also possible for the flow of energy to be reversed so that power stored in the mechanical system is fed back into the mains again in the same way.

The supply power is calculated firstly in relation to the nominal power demand and secondly the maximum total peak power in the system. For example, in the case of injection moulding machines in the high-performance field, it is striking in that respect that the ratio between peak and nominal power is up to 4:1.

As the power output stages must be designed for the maximum power to be involved that ratio requires the use of large output stages which are then not used to full capacity. That situation drives up the costs of the drive systems.

As the overload must be provided exclusively by the mains, then high peak power tariffs are implemented by the mains network operator.

To sum up, the following disadvantages occur in power supply apparatuses in accordance with the state of the art:
I. Large supply apparatuses
II. High losses
III. High costs
IV. Poor capacity utilization
V. High peak powers
VI. High reactive power demand.

SUMMARY OF THE INVENTION

The object of the invention is to provide a power supply apparatus for a shaping machine and a method of power supply for a shaping machine, wherein the storage capacity of the power storage device is reduced or the occurrence of mains peak powers is reduced.

The object is effected by:
  establishing a first range and a second range for the voltage measured at the intermediate circuit or the current measured at the intermediate circuit, wherein the second range is smaller than the first range and is completely contained in the first range, and
  increasing in magnitude a mains power furnished by the power supply mains to an intermediate circuit if the measured voltage or the measured current leaves the first range and reducing in magnitude the mains power if the measured voltage or the measured current passes into the second range.

The first and the second range can each be given by the values above or below a limit value or threshold value. Equally the ranges can be given by values between two limit values or threshold values. Naturally, more complex value ranges are also conceivable.

The term "increased in magnitude" can be interpreted as meaning that negative mains powers are reduced and positive mains powers are increased.

The criterion as to whether the second range is smaller than the first range and is contained completely in the first range can be that there are values which are part of the first range but not part of the second range and there are no values which are part of the second range but not part of the first range.

It is to be noted that the closed-loop regulating device of the power supply apparatus according to the invention does not have to implement closed-loop control of a voltage at the intermediate circuit or a current occurring at the intermediate circuit, in the sense that the measured voltage or the measured current is regulated to a target value in closed-loop mode. Rather, the term closed-loop regulation is to be interpreted here in a somewhat broader sense, that the measured voltage or the measured current is kept in an acceptable range. Naturally, it is nonetheless possible to additionally provide for open-loop control or closed-loop regulation of a parameter—for example the voltage or the current—of the intermediate circuit.

Unless explicitly stated otherwise, the word "or" for the purposes of this patent specification is to be interpreted inclusively, that is to say the application of the two options separated by "or" is also possible.

The invention makes it possible to use smaller supply systems which are designed for a ratio of less than 2:1 of peak power to nominal power. That makes it possible to provide for good capacity utilization in operation. In order to fulfill the demand for peak power that technically still persists, an integrated electrical power storage device is provide. That storage device, however, is limited by its size and power provision capability and is therefore less cost-intensive as the design implementations and size of the power storage device have a great influence on the manufacturing costs thereof. A large part of the machines is not operated in the peak power range. By virtue of the invention, it is possible to avoid the design of the power storage device being matched to the peak power range, as was still necessary in the state of the art. The invention permits a reduction in size and the cost saving that this entails.

In accordance with the invention, therefore, the power demand which is to be additionally provided by the power storage device can be calculated on the basis of an average power profile. Shaping machines according to the invention nonetheless ensure satisfactory functioning as even peak power levels which the power storage device can no longer compensate for are compensated for by additional power from the power supply mains network.

An aspect of the invention lies in the realization that a great increase in the motor or generator power of the at least one drive can be detected by the voltage measured at the intermediate circuit or the current measured at the intermediate circuit.

That also applies to subsequent stabilization of the power of the at least one drive. The proposed closed-loop regulation achieves a hysteresis effect, that is to say it prevents the situation where, after release of the mains peak power, immediate limitation in respect of the mains peak power is effected (switching to and fro between released and blocked mains peak power would be the consequence). That presence of a situation-dependent period of time before a reduced amount of power is taken from the power supply mains again (or is supplied thereto) makes it possible for the system of intermediate circuit, at least one drive of the shaping machine and power storage device to pass into a stable state again.

Further advantageous embodiments of the invention are defined in the appendant claims of the invention.

Preferably, the closed-loop regulating device is adapted to increase a mains power furnished by the power supply mains to the intermediate circuit if the measured voltage or the measured current falls below a lower limit value, and to reduce the mains power if the measured voltage or the measured current exceeds a lower threshold value, wherein the lower threshold value is greater than the lower limit value. In that case, it is to be noted that, when the measured voltage is a DC voltage or the measured current is a direct current, a positive convention is to be selected for the measurement value. In this embodiment, the first range is given by values which are greater than the lower limit value. In this case, the second range is given by values greater than the lower threshold value.

In power supply apparatuses which provide for a regenerative feedback of electric power to the power supply network, preferably the closed-loop regulating device is adapted to increase a regenerative power furnished by the intermediate circuit to the power supply mains if the measured voltage or the measured current exceeds an upper limit value and to reduce the regenerative power if the measured voltage or the measured current falls below an upper threshold value, wherein the upper limit value is greater than the upper threshold value.

In contrast to the mains power, the regenerative power is counted positively if power is furnished by the intermediate circuit to the power supply mains. The mains power will therefore generally be the negative value of the regenerative power.

In this embodiment, the first range is given by values below the lower threshold value and the second range by values above the lower threshold value.

Naturally, a combination of those two embodiments is also conceivable. In that case, the first range is formed by the values between the lower limit value and the upper limit value. The second range includes the values between the lower threshold value and the upper threshold value.

A particularly simple embodiment of the invention can be provided by the intermediate circuit having an intermediate circuit capacitor preferably connected in parallel.

Particularly when the intermediate circuit has an intermediate circuit capacitor, preferably the measuring device is in the form of a voltage measuring device and the measured voltage or the measured current is an intermediate circuit voltage at the intermediate circuit, and the intermediate circuit voltage is preferably an electric voltage at the intermediate circuit capacitor.

For a rapid return to a stable situation in the intermediate circuit, the closed-loop regulating device can be adapted to increase the mains power in magnitude to a maximum mains power if the measured voltage or the measured current leaves the first range.

In order to prevent the occurrence of costly mains power peaks even during the stable mode of operation, the closed-loop regulating device can be adapted to limit the mains power in magnitude to a fixed multiple—preferably 1.1 times—a nominal power of the power supply mains if the measured voltage or the measured current passes into the second range.

Protection is also claimed for a shaping machine having a power supply apparatus according to the invention.

The invention can preferably be used in relation to a power storage device with at least one storage capacitor for the storage of electric power. For, with such a power storage device, it is possible to achieve a particularly high cost saving by a reduction in the storage capacity.

The power storage device can be integrated into the power supply apparatus or can be afforded separately.

Preferably, a capacitance of the at least one storage capacitor is greater than a capacitance of the intermediate circuit capacitor. Quite preferably, the capacitance of the storage capacitor can be greater by a factor of 10 to 30 than that of the intermediate circuit capacitor.

BRIEF DESCRIPTION OF THE DRAWINGS

Further advantages and details of the invention will be apparent from the Figures and the related specific description. In the Figures:

FIGS. 3a and 3b are graphs and a flow chart in respect of a second embodiment of a power supply apparatus according to the invention.

DETAILED DESCRIPTION OF THE INVENTION

Figure 1:
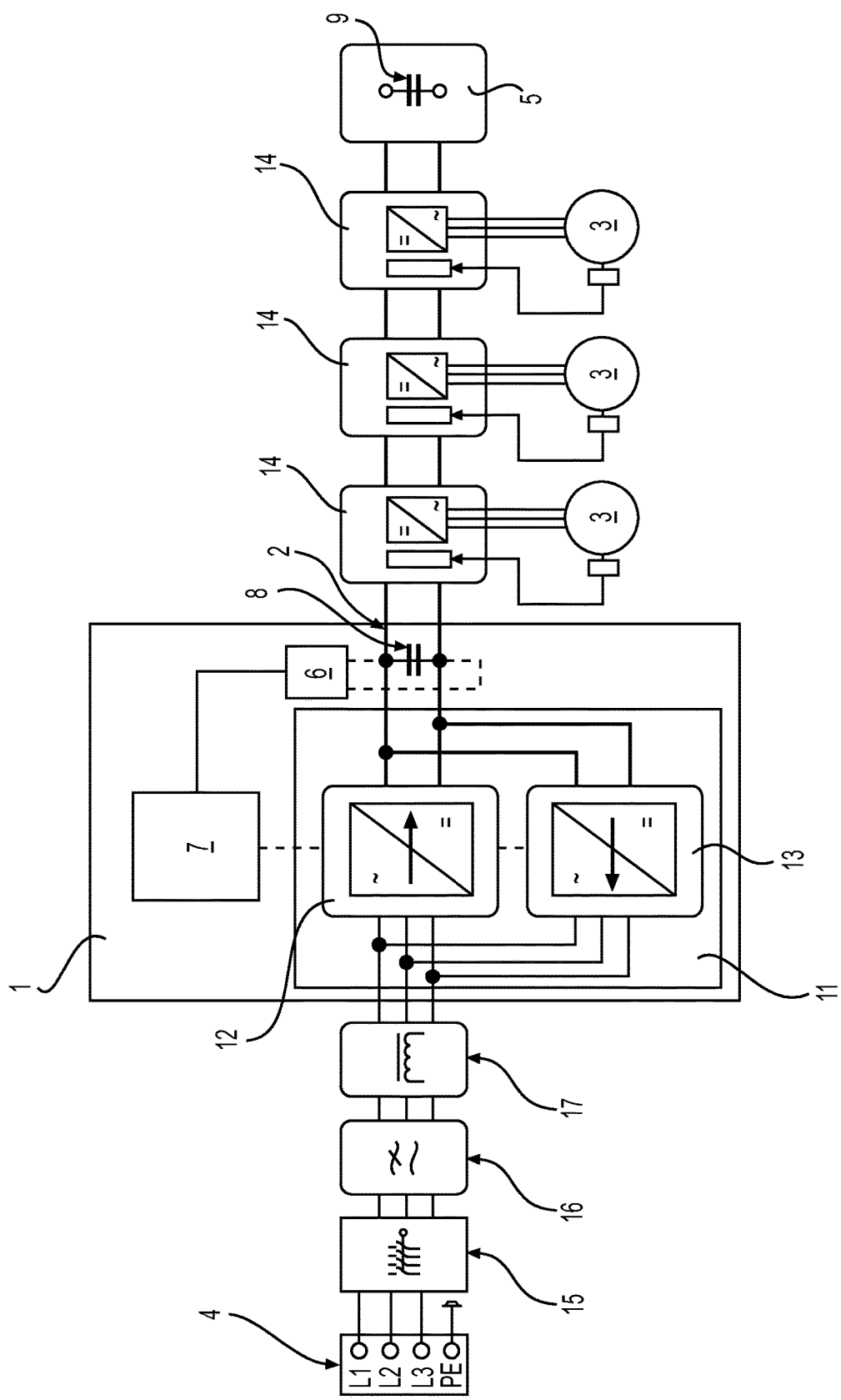
FIG. 1 is a schematic circuit diagram of a power supply apparatus according to the invention and connected to a power supply mains network, three drives of the shaping machine and a power storage device.

FIG. 1 shows a diagrammatic view of a power supply apparatus 1 according to the invention, which in the condition of being connected to the drives 3 is adapted to supply them with electric power. The power supply apparatus 1 is connected to a plurality of drives 3 of the shaping machine, the power supply mains 4, and the power storage device 5. The number of drives 3 connected to the power supply apparatus is not essential for the invention. To connect the intermediate circuit 2 of the power supply apparatus 1, it has a mains connection module 11 connected to the intermediate circuit 2. The mains connection module 11 can also be connected to the power supply mains 4, the connected condition being shown in FIG. 1. Connected between the power supply mains 4 and the mains connection module 11 are a physical switch 15 (main switch), a mains filter 16 and a mains choke 17.

The mains connection module 11 has a rectifier 12 for rectification of an AC voltage supplied by the power supply mains 4. The system also has an inverter 13 which can produce an AC voltage from the DC voltage in the intermediate circuit 2. That permits power feedback from the intermediate circuit 2 to the power supply mains 4. Both the rectifier 12 and also the inverter 13 are connected in parallel relationship with the intermediate circuit capacitor 8 of the intermediate circuit 2.

The separation between the rectifier 12 and the inverter 13 serves for easier representation of the diagrammatic configuration. In practical use, those elements are generally in a single component (the mains feedback is therefore implemented by way of one or more IGBTs).

The power inverters 14 which are controlled in open-loop or closed-loop fashion for a plurality of drives 3 of the shaping machine are also connected in parallel with the intermediate circuit capacitor 8. The power inverters 14 convert the DC voltage from the intermediate circuit 2 into AC voltage for operation of the drives 3. Finally, the power storage device 5 is connected in parallel with the intermediate circuit capacitor 8. The power storage device 5 has at least one capacitor for the storage of electric power, connected in parallel with the intermediate circuit capacitor 8. Its overall capacitance is symbolically represented by a capacitor 9. The power supply apparatus 1 also has a voltage measuring device 6 for measuring the intermediate circuit voltage $U_{ZK}$. The measurement values of the voltage measuring device 6 are passed to the closed-loop regulating device 7. On the basis of those measurement values, the regulating device 7 regulates the rectifier 12 and the inverter 13. The mode of operation of the regulating device 7 is described hereinafter with reference to FIGS. 2a and 2b and 3a and 3b.

With the arrangement shown in FIG. 1 it is possible for the drives 3 to be supplied with electric power.

Figure 2A:
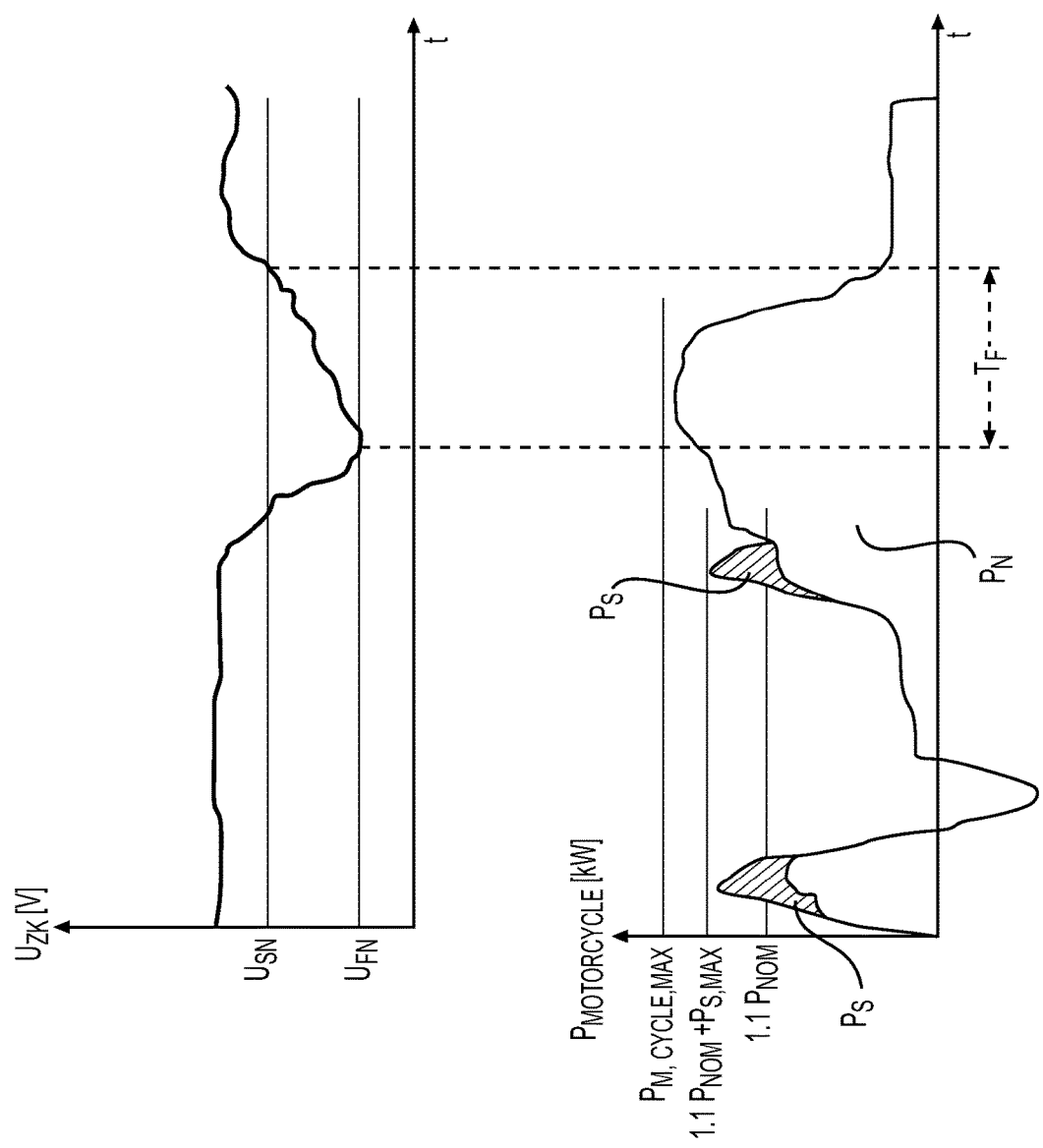
FIGS. 2a and 2b are graphs and a flow chart relating to the mode of operation of a first embodiment of a power supply apparatus according to the invention.

FIG. 2a shows two graphs, wherein the first graph shows a hypothetical configuration of an intermediate circuit voltage $U_{ZK}$ and the second graph shows a hypothetical configuration of the total power consumed by the drives 3 during a cycle, identified as $P_{MotorCycle}$. As can be seen from the configuration of the two graphs in this case, the intermediate circuit voltage $U_{ZK}$ collapses due to a high consumed power of the drives 3.

The mode of operation of the regulating device 7 in this case will now be described by reference to the flow chart of FIG. 2b. Firstly, the regulating device 7 checks whether the intermediate circuit voltage $U_{ZK}$ is greater than a lower limit value $U_{FN}$. If that is the case, the mains power $P_N$ is limited to 1.1 times the nominal power $P_{NOM}$. For clarification purposes, the flow chart includes a visualization of a possible division of the total power consumed at the drives 3 between the mains power $P_N$ and the storage device power $P_S$ furnished by the power storage device 5. Following the flow chart, a check is then again made to ascertain whether the intermediate circuit voltage $U_{ZK}$ is greater than the lower limit value $U_{FN}$ for the enablement of mains peaks. If that is no longer the case, which occurs in the graphs in FIG. 2a at the moment in time of the left-hand vertical line, then the maximum mains power is enabled. That is shown in the flow chart by $P_{N,MAX}$. In this case, a possible division is also shown between the maximum mains power $P_{N,MAX}$ and the storage means power $P_S$ in order to achieve the complete system power 2 which is furnished to the drives 3. As can be seen, the ratio has shifted in the direction of the power furnished by the power supply mains. As long as that maximum system power is allowed, a check is made in accordance with the flow chart to ascertain whether the intermediate circuit voltage $U_{ZK}$ is greater than the lower threshold value $U_{SN}$. If that is still not the case, then enablement of the maximum mains power $P_{N,MAX}$ is maintained.

If, however, the intermediate circuit voltage $U_{ZK}$ again reaches the lower threshold value $U_{SN}$, which is the case in the graphs in FIG. 2a at the moment in time of the right-hand vertical line, then the mains power $P_N$ is again limited to 1.1 times the nominal power $P_{NOM}$ of the power supply mains 4. In accordance with the flow chart in FIG. 2b, that is firstly effected after a check as to whether the intermediate circuit voltage $U_{ZK}$ is greater than the lower limit value $U_{FN}$. As at that time, however, it has already been checked that the intermediate circuit voltage $U_{ZK}$ is greater than the lower threshold value for blocking the mains peaks. As $U_{SN}$ is greater than $U_{FN}$, that normally leads to the left-hand arm of the flow chart.

The period of time $T_F$ is the period occurring in the case of the hypothetical configuration of the intermediate circuit voltage $U_{ZK}$ between enablement of mains peaks and the subsequent restriction on the mains peaks. As can be seen, that time difference $T_F$ allows the system to recover to a stable state.

In addition, the lower graph in FIG. 2a also shows the configuration in the division between the mains power $P_N$ furnished by the power supply mains 4 and the power $P_S$ furnished by the power storage device. Until enablement of the mains peaks, the mains power $P_N$ remains below the level given by 1.1 $P_{NOM}$. The rest of the power is respectively furnished by the power storage device 5.

An unusually high power occurs close to the total of the maximum powers of the storage device and the limited mains power $P_N$ (in the graph identified as 1.1 $P_{NOM}$+ $P_{S,max}$). If the intermediate circuit voltage $U_{ZK}$ begins to collapse as the high power consumption extends over a prolonged period of time, the intermediate circuit voltage $U_{ZK}$ falls below the lower limit value $U_{FN}$ for enablement of the mains peak, which triggers the above-described performance of the regulating device 7.

As can further be seen, the costly mains peak power is used only in a tight region around the maximum overall motor power $P_{M,Cycle,max}$ achieved during a cycle. That permits the power storage device 5 to be of relatively small size with at the same time economical use of mains peak power.

In addition, it can be seen from the lower graph in FIG. 2a that the mains power $P_N$ falls briefly into the negative range. Here, therefore, power is fed back to the power supply mains 4 or the power storage device 5 is charged.

Figure 2B:
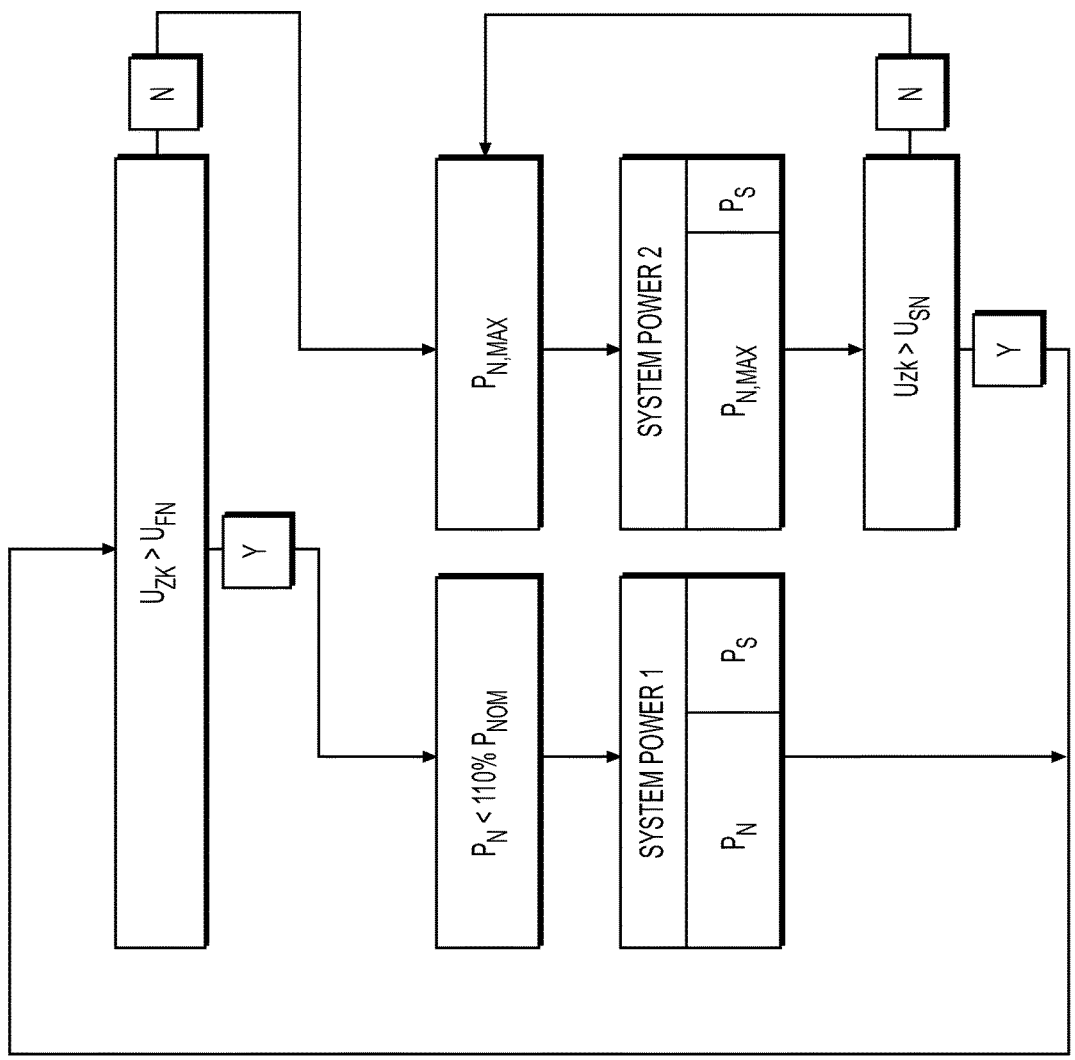
Figure 3B:
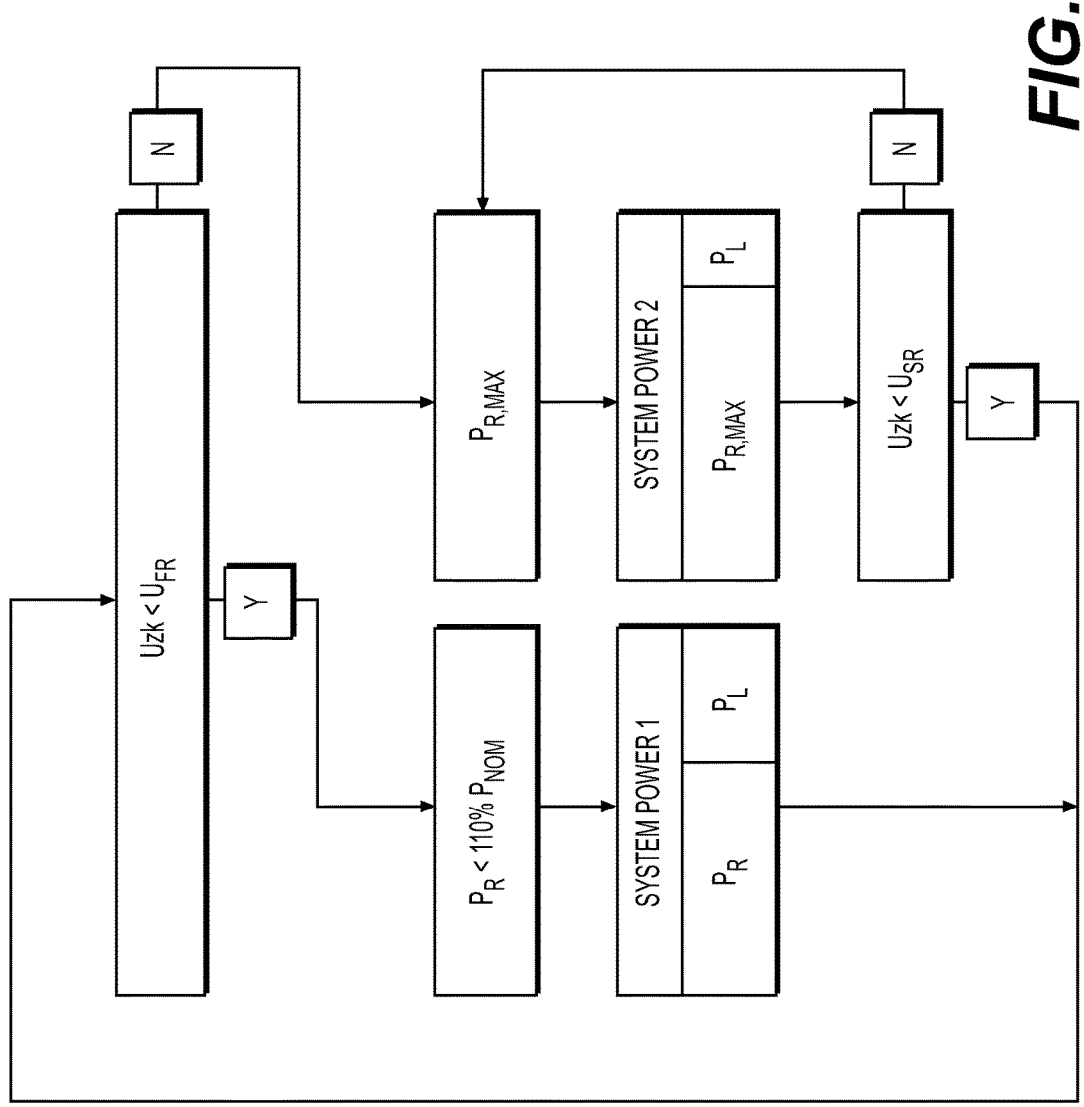

FIGS. 3a and 3b are similar to FIGS. 2a and 2b, wherein the first-mentioned are concerned with regenerative power feedback to the power supply mains 4.

While the upper graph in FIG. 3a again shows a hypothetical configuration of the intermediate circuit voltage $U_{ZK}$, the lower region now shows a power from the drives 3 to the intermediate circuit 2 (identified as $P_{BrakeCycle}$). That power is similarly divided into a regenerative power $P_R$ and a charging power $P_L$ which are implemented at the power supply mains 4 and at the power storage device 5 (for charging), respectively. Naturally, the powers referred to here precisely correspond to the negative value of the similar powers in FIGS. 2a and 2b. In other words:

$$P_{BrakeCycle}=-P_{MotorCycle}, P_R=-P_N, P_L=-P_S$$

By virtue of the generator operation of the drives 3 in this case, the intermediate circuit voltage $U_{ZK}$ rises above the upper limit value $U_{FR}$ for the enablement of mains peaks (mains regenerative peaks). Before that happens, the mains regenerative power $P_R$ is limited to 1.1 times the nominal power $P_{NOM}$ of the power supply mains (with the corresponding division of the system power 1 to the regenerative power $P_R$ and the charging power $P_L$). In this case, the nominal power $P_{NOM}$ for drawing power from the power supply mains 4 is of the same magnitude as the nominal power $P_{NOM}$ of the power supply mains 4 for the feedback of power into the mains network. Naturally, the embodiments can be easily adapted to take account of any asymmetry in that respect.

As soon as the intermediate circuit voltage $U_{ZK}$ rises above the upper limit value $U_{FR}$ then the maximum regeneration power $P_{R,MAX}$ is enabled in accordance with the flow chart in FIG. 3b. Here, too, attention is again directed to the corresponding visualization of the system power 2, in this case the maximum regeneration power $P_{R,MAX}$ and the charging power $P_L$. A check is then made to ascertain whether the intermediate circuit voltage $U_{ZK}$ has again fallen below the upper threshold value $U_{SR}$ for blocking the regeneration peaks. If that is not the case, the maximum regeneration remains allowed. If that is already the case, the circuit in the flow chart begins afresh, similarly to FIG. 2b.

In this case, it is also possible to see the period of time $T_R$, over which the maximum regeneration powers are allowed. Here, too, this guarantees the attainment of a stable condition of the intermediate circuit 2 after an increased voltage. Similar details in regard to the maximum cycle power $P_{B,Cycle,max}$, the maximum limited power $1.1\ P_{NOM}+P_{L,max}$, and the limitation of $1.1\ P_{NOM}$ for the regeneration power $P_R$ apply similarly to those in respect of FIG. 2a. The fall of the regeneration power $P_R$ into the negative range marks the withdrawal of power from the power supply mains 4.

It is to be noted that the configuration, appearing the same, of the overall brake power $P_{BrakeCycle}$ and the overall motor power $P_{MotorCycle}$ in FIG. 2a only have the same appearance in order to be able easily to communicate the principle of the invention. In reality $P_{BrakeCycle}$ and $P_{MotorCycle}$ will not appear the same, in particular as $P_{BrakeCycle} = -P_{MotorCycle}$.

Naturally, an embodiment in which both the regulating effects in FIGS. 2a and 2b and FIGS. 3a and 3b are implemented is not only conceivable but preferred.

The invention claimed is:

1. A power supply apparatus for a shaping machine, comprising:
   an intermediate circuit to be connected to at least one drive of the shaping machine, a power supply mains, and a power storage device,
   a measuring device for measuring an electric voltage or an electric current at the intermediate circuit, and
   a closed-loop regulating device configured to regulate a power transfer between the power supply mains and the intermediate circuit depending on the measured voltage or the measured current,
   wherein the closed-loop regulating device is configured to increase in magnitude a mains power furnished by the power supply mains to the intermediate circuit if the measured voltage or the measured current leaves a first range, and to reduce in magnitude the mains power if the measured voltage or the measured current passes into a second range, the second range being smaller than the first range and being completely contained in the first range.

2. The power supply apparatus according to claim 1, wherein the closed-loop regulating device is configured to increase a mains power furnished by the power supply mains to the intermediate circuit if the measured voltage or the measured current falls below a lower limit value, and to reduce the mains power if the measured voltage or the measured current exceeds a lower threshold value, the lower threshold value being greater than the lower limit value.

3. The power supply apparatus according to claim 1, wherein the closed-loop regulating device is configured to increase a regenerative power furnished by the intermediate circuit to the power supply mains if the measured voltage or the measured current exceeds an upper limit value, and to reduce the regenerative power if the measured voltage or the measured current falls below an upper threshold value, the upper limit value being greater than the upper threshold value.

4. The power supply apparatus according to claim 1, wherein the intermediate circuit has an intermediate circuit capacitor.

5. The power supply apparatus according to claim 4, wherein the intermediate circuit capacitor is connected in parallel.

6. The power supply apparatus according to claim 1, wherein the measuring device is a voltage measuring device, and the measured voltage or the measured current is an intermediate circuit voltage at the intermediate circuit.

7. The power supply apparatus according to claim 6, wherein the intermediate circuit voltage is an electric voltage at the intermediate circuit capacitor.

8. The power supply apparatus according to claim 1, wherein the closed-loop regulating device is configured to increase the mains power in magnitude to a maximum mains power if the measured voltage or the measured current leaves the first range.

9. The power supply apparatus according to claim 1, wherein the closed-loop regulating device is configured to limit the mains power in magnitude to a fixed multiple of a nominal power of the power supply mains if the measured voltage or the measured current passes into the second range.

10. The power supply apparatus according to claim 9, wherein the closed-loop regulating device is configured to limit the mains power in magnitude to 1.1 times the nominal power of the power supply mains if the measured voltage or the measured current passes into the second range.

11. The power supply apparatus according to claim 1, further comprising a mains connection module connected to the intermediate circuit for transferring electric power between the power supply mains and the intermediate circuit.

12. The power supply apparatus according to claim 11, wherein the mains connection module has a rectifier connected to the intermediate circuit for rectification of an AC voltage supplied by the power supply mains.

13. The power supply apparatus according to claim 11, wherein the mains connection module has an inverter connected to the intermediate circuit for providing an AC voltage for the power recovery of electric power back to the power supply mains.

14. A shaping machine having the power supply apparatus according to claim 1.

15. The shaping machine according to claim 14, wherein the intermediate circuit is connected to (i) the at least one drive of the shaping machine, or (ii) to a power storage device.

16. The shaping machine according to claim 15, wherein the power storage device has at least one storage capacitor for the storage of electric power.

17. The shaping machine according to claim 16, wherein the intermediate circuit has an intermediate circuit capacitor, and a capacitance of the at least one storage capacitor is greater than a capacitance of the intermediate circuit capacitor.

18. The shaping machine according to claim 17, wherein the capacitance of the at least one storage capacitor is greater by a factor of 10 to 30 than the capacitance of the intermediate circuit capacitor.

19. The shaping machine according to claim 16, wherein the intermediate circuit is connected to the power supply mains.

20. The shaping machine according to claim 19, wherein the intermediate circuit is connected to the power supply mains by a mains connection module.

21. The shaping machine according to claim 15, wherein the intermediate circuit is connected to (i) a closing drive and an injection drive of the shaping machine or (ii) to a power storage device.

22. A method of power supply of a shaping machine, comprising:
- supplying at least one drive of the shaping machine with electric power by an intermediate circuit;
- measuring a voltage or a current at the intermediate circuit;
- establishing a first range and a second range for the measured voltage or the measured current, the second range being smaller than the first range and being contained completely in the first range; and
- increasing in magnitude a mains power furnished by the power supply mains to an intermediate circuit if the measured voltage or the measured current leaves the first range, and reducing in magnitude the mains power if the measured voltage or the measured current passes into the second range.

* * * * *